Dec. 12, 1939.  R. S. C. FOW  2,183,367
VEHICLE LIFTING JACK
Filed Aug. 23, 1938  2 Sheets-Sheet 1
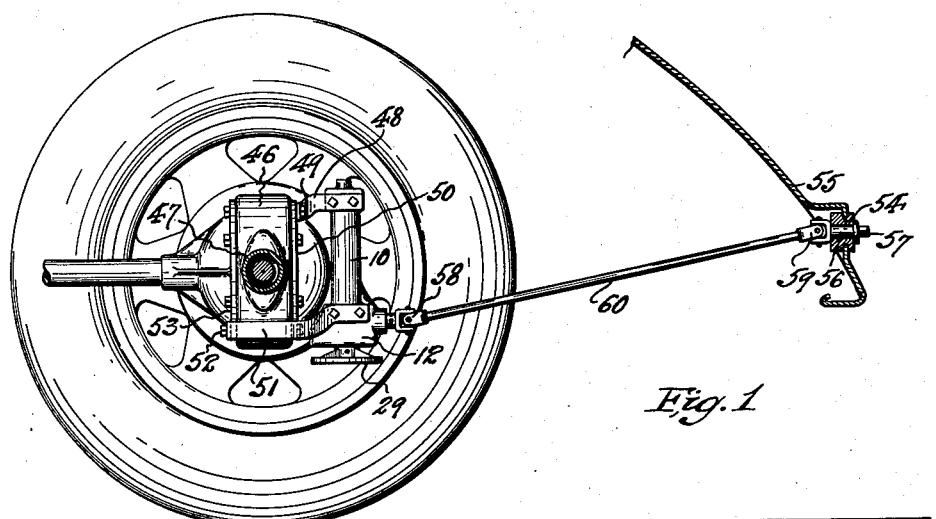
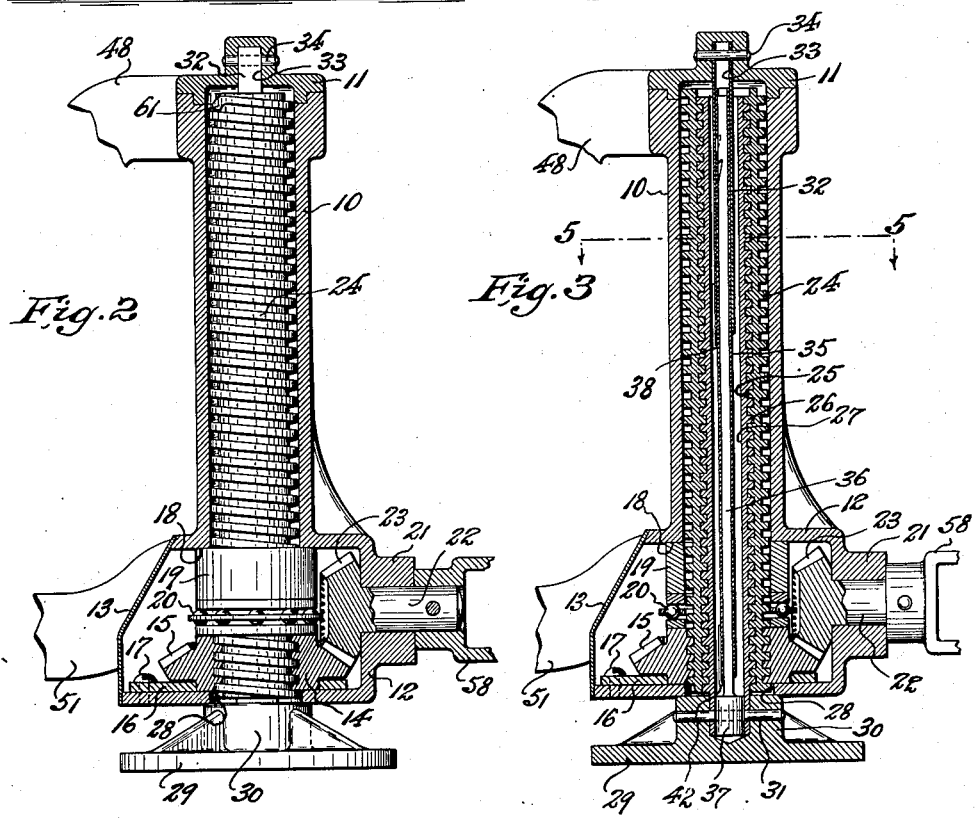
INVENTOR.
Raymond S. C. Fow,
BY George D. Richards
ATTORNEY.

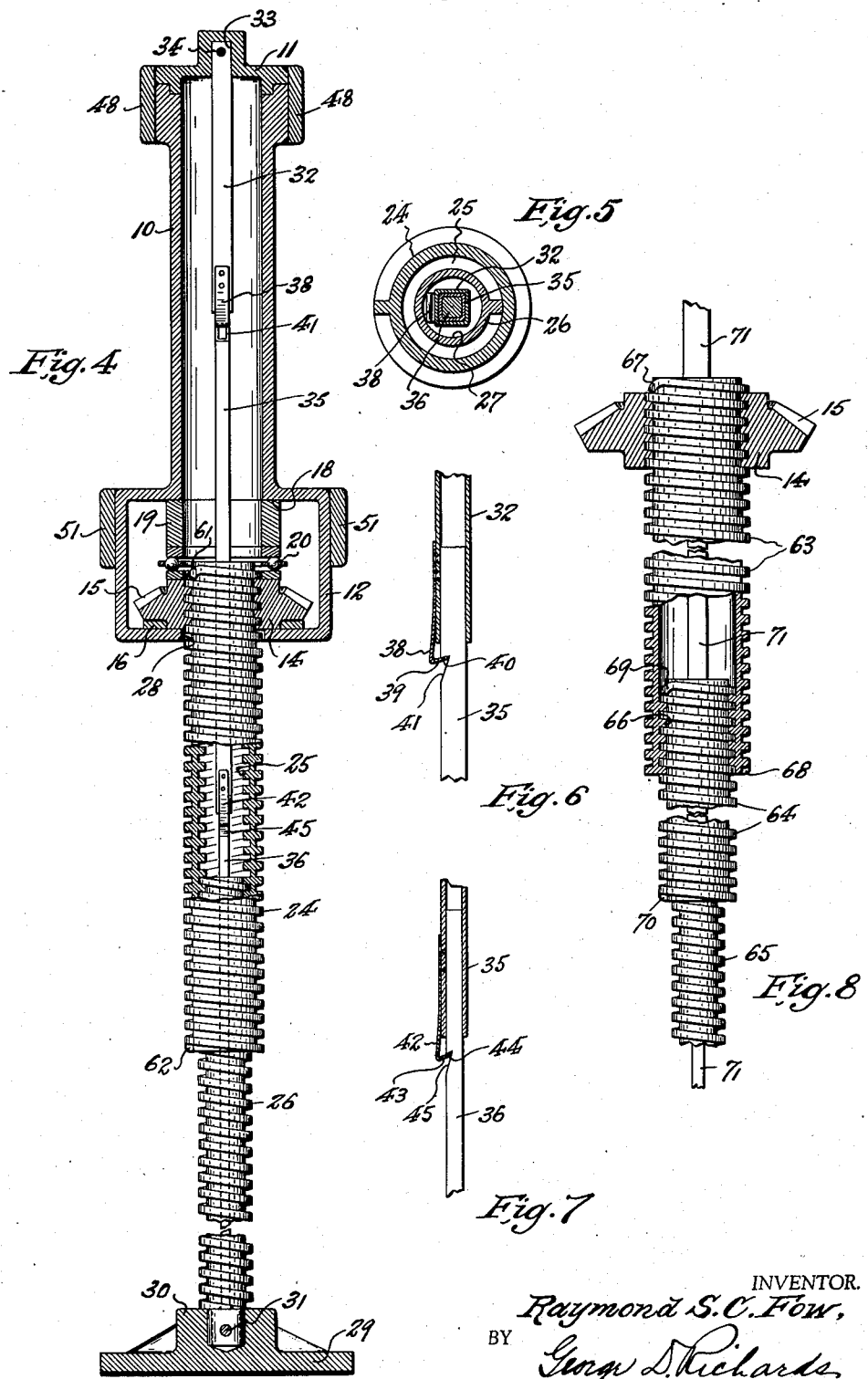

Patented Dec. 12, 1939

2,183,367

UNITED STATES PATENT OFFICE 2,183,367

VEHICLE LIFTING JACK

Raymond S. C. Fow, Newark, N. J., assignor to Alfred De Cozen, Newark, N. J.

Application August 23, 1938, Serial No. 226,211

2 Claims. (Cl. 254—86)

This invention relates, generally, to improvements in vehicle lifting jacks; and the invention has reference, more particularly, to improvements in jack mechanism applicable to both built-in and portable types of jacks, but which possesses special advantage in connection with the former types of jacks which are affixed to vehicle structures as permanent equipment thereof.

This invention has for an object to provide a novel construction of vehicle lifting jack mechanism which is adapted for permanent attachment to vehicle axle members (as e. g. in connection with the differential gearing housing of an automobile rear axle structure), whereby the jack is ready for use at all times in case of need; and to such end to provide a novel jack mechanism which may be easily and quickly actuated from a point exteriorly of the vehicle, preferably having permanently mounted actuating means for such purpose; which is so constructed and arranged that, when contracted to out of service condition, it will not project into or reduce the road clearance space between the axle structure and the road surface; and which is so devised that its parts can not be easily accidentally disorganized during the operations of expanding or contracting the same.

This invention has for a further object to provide in a jack mechanism of either the built-in or portable type, a novel multiple lifting screw structure, so arranged that the lifting screw sections are automatically successively operated when the jack is actuated, novel means being provided to both assure such successive action of the screw sections as well as to positively limit the maximum extension of the same so that accidental separation thereof from their cooperative relations is efficiently guarded against.

Other objects of this invention, not at this time more particularly enumerated, will be understood from the following detailed description of the same.

Illustrative embodiments of this invention are shown in the accompanying drawings, in which:

Fig. 1 is a side elevation of the novel jack mechanism according to this invention, and as permanently mounted in connection with the rear axle structure of an automobile, portions of the latter being shown in section.

Fig. 2 is a longitudinal vertical section of the jack mechanism per se with the lifting screws and associated parts shown in elevation, the jack mechanism being shown in normal out of service or contracted condition; Fig. 3 is a similar view, showing the lifting screws and associated parts in section; Fig. 4 is a similar view showing the jack mechanism in expanded or service condition; Fig. 5 is a transverse section through the lifting screw structure, taken on line 5—5 of Fig. 3 but drawn on an enlarged scale; Fig. 6 is a fragmentary view in part section showing the expansion limiting detent or stop means between an upper and intermediate section of a check key means which is cooperative with the lifting screws; and Fig. 7 is a similar view showing the detent or stop means between an intermediate and lower section of said check key means.

Fig. 8 is a fragmentary view of a modified form of lifting screw arrangement, parts thereof being shown in section.

Similar characters of reference are employed in the above described views, to indicate corresponding parts.

Referring to the drawings, the casing of the jack mechanism comprises a tubular cylindrical body 10, closed at its upper end by a top cap 11 which is affixed thereto in any suitable manner. Said casing body 10 is enlarged at its lower end to provide a suitably shaped gearing housing 12, one side of which is open but normally closed by a suitably secured cover plate 13.

Mounted within said housing 12, in axial alignment with the bore of said casing body 10, is a rotatable internally screw-threaded lift screw drive nut 14, the same having, unitary therewith, a peripheral bevel gear portion 15 by which rotary motion may be imparted thereto. Said nut 14 is held against displacement from operatively aligned relation to the casing body bore by a bearing plate 16 arranged to embrace the lower end of said nut; said bearing plate being detachably affixed to the bottom wall of said housing 12 by fastening screws 17, or any other suitable form of fastening means.

Abutting the internal shoulder 18, which is provided by the juncture of the casing body 10 with the upper wall of said housing 12, is an annular thrust block 19, the bore of which is axially aligned between the casing body 10 and said nut 14. Preferably arranged between said thrust block 19 and said nut 14 is an anti-friction thrust bearing of suitable kind, such e. g. as the ball-bearing 20.

Provided in a wall of said housing 12 is a bearing member 21, and rotatably mounted in said bearing member is the journal 22 of a bevel drive gear 23 which is adapted to mesh with and transmit operative motion to the gear portion 15 by which said lift screw drive nut 14 is actuated.

The lift screw structure of the jack comprises a plurality of telescoping lift screw sections having threaded connection one with the other, means being provided in cooperation with said screw sections to control their relative movements so that they move successively in expanding and contracting, and so that their relative expanding movements are positively limited. In a simple form thereof, which is illustrative of the principles of this invention, and as shown more particularly in Figs. 2 to 4 inclusive of the drawings, said lift screw structure comprises an outer screw section 24, the external threads of which are operatively engaged by the internal threads of the drive nut 14. Said outer screw section 24 is internally screw-threaded, as at 25, to engage the external screw-threads of an inner screw section 26. While the outer screw section 24 as shown in Figs. 2, 3 and 4 to be internally threaded throughout its length, this is optional, since said internal screw threads may be omitted except along a portion of the lower end of its bore where the same are at least required for operatively threading together the outer and inner screw sections 24 and 26. The inner screw section 26 is provided with an open axial bore 27 extending throughout the length thereof. Provided in the bottom wall of the housing 12 is an opening 28 through which the lift screw sections may be projected when the same are operatively extended. Affixed to the lower end of said inner screw section 26 is a jack shoe or foot plate 29. Said jack shoe or foot plate 29 is provided with a hub portion 30 in which the lower end of said inner screw section 26 is received and to which it is immovably affixed by a cross-pin 31. Means are provided for both retaining said inner screw section against relative movement and for also positively limiting the expanding extension of the lift screw structure. This means comprises an extensible check key structure, which extends and is non-rotatively secured between the top end of the casing body 10 and the lower end of the inner screw section 26 and jack-shoe or foot plate 29 carried by the latter. In an illustrative form thereof, said check key structure includes an upper tubular key member 32, the upper extremity of which is entered in a socket 33 provided in the top cap 11, and is immovably secured thereto by a cross-pin 34, thus anchoring the upper end of the check key structure to the top end of the casing body in fixed relation thereto both against axial and rotative movement. Telescopically slidable in said upper key member 32 is a tubular intermediate key member 35; and, in like manner, telescopically slidable in said intermediate key member is a lower key member 36. The lower extremity of said lower key member 36 is anchored to the lower end of the inner screw section 26 and the jack shoe or foot plate 29 associated therewith, preferably by the extension of said cross-pin 31 through an enlargement 37 thereof which fills the lower end portion of the inner screw section bore. Preferably said key members are of square cross-sectional shape so as to prevent relative rotative movements thereof, but it will be obvious that any other cross sectional shape or any other means may be provided to assure such relative non-rotation while permitting required relative movements thereof axially. Cooperative with the upper and intermediate key members 32 and 35 is a detent or stop means to limit axial extension movement of the latter relative to the former. An illustrative form of such detent or stop means comprises, a yieldable detent finger 38 suitably affixed by its upper end to said upper key member 32, with its free end overhanging the lower extremity of the latter. Projecting angularly from the free end of said detent finger 38, and toward the adjacent side of said intermediate key member 35, is a stop lug or bill 39. Provided at a suitable location in the side of said intermediate key member 35 is an indented stop shoulder 40 below which is an outwardly inclined release cam portion 41. Cooperative with the intermediate and lower key members 35 and 36 is a like detent or stop means comprising, a yieldable detent finger 42 affixed to said intermediate key member 35 and having a stop lug or bill 43 engageable with an indented stop shoulder 44 provided in a face of the lower key member 36, the latter also having below said shoulder 44 an outwardly inclined release cam portion 45.

The jack mechanism comprising the novel construction above set forth is especially adapted for permanent connection with an axle of an automobile. In one such arrangement, as shown in Fig. 1 of the drawings, the jack mechanism is permanently affixed to the differential gear case 46 of the rear axle 47 of an automobile. This is accomplished by the provision of upper carrying brackets 48 which are secured to and extend from the upper end portion of the jack casing body 10, the opposite ends of said brackets being secured to the differential gear case by certain of the bolts 49 which secure the rear cover plate 50 of said gear case to the main body thereof. In like manner, lower carrying brackets 51 are secured to and extend from the jack gearing housing 12 so as to straddle the differential gear case 46, with the opposite ends of said brackets 51 secured to the differential gear case by certain of the bolts 52 which secure the front cover plate 53 to the main body thereof. By this arrangement the jack casing is affixed to and stationed behind the differential gear case in a perpendicular position, with the jack shoe or foot plate 29 directed downwardly toward the road or ground surface. It will be understood that any other suitable means for permanently affixing the jack mechanism to the automobile axle structure may be employed.

When mounted as a permanent installation in connection with the rear axle structure of an automobile, built-in means may also be provided for operatively manipulating the jack mechanism. An illustrative means for this purpose is also shown in Fig. 1 of the drawings, the same comprising a bearing block 54 suitably affixed in connection with a selected portion of the rear end structure 55 of the automobile body. Journaled in this bearing block 54 is a rotatable spindle 56, having an exposed squared rear end 57 or equivalent means for detachably applying an operating crank (not shown) thereto for turning the same. Interconnected between said spindle 56 and the journal 22 of the jack drive gear 23, by means of universal joint couplings 58 and 59, is a transmission shaft 60.

In the operation of the jack mechanism when applied to an automobile in the permanent or built-in form above described, the operator applies a suitable crank wrench to the head 57 of the spindle 56 and thereupon turns the same in a clockwise direction, thereby transmitting motion through the shaft 60 to the bevel drive gear 23, which in turn rotates the drive nut 14 in a direction adapted to impart downward axial movement to the lift screw structure. Since the drive nut 14 acts directly upon the external threads of the outer screw section 24, the latter is caused to first move downward so as to be projected from the lower end of the casing body 10 and housing 12. During such downward axial movement of the outer screw section 24, the same does not rotate, and consequently carries downward therewith the inner screw section 26 without producing axial movement of the latter relative to said outer screw section 24. As the outer screw section 24 approaches the limit of its downward axial projection, an upper stop element 61 with which it is provided engages the drive nut 14 so as to prevent further axial movement of said outer screw section relative to said drive nut. Engagement of said stop element 61 with the drive nut 14 interlocks the outer screw section 24 with said drive nut 14, so that ensuing rotative movement of the latter is thereupon immediately imparted to the former. Owing to the provision of the extensible check key means which so couples the inner screw section 26 with the casing body 10 as to prevent rotation of said inner screw section, it follows that, upon initiation of the rotation movement of the outer screw section 24, the internal screw threads 25 of the latter thereupon act as a drive nut upon said inner screw section 26, thus causing said inner screw section 25 to be advanced or outwardly projected axialy downward from the lower end of the outer screw section 24 (see Fig. 4). This movement continues until the jack shoe or foot plate 29 contacts the road surface or ground, whereupon further downward movement of said inner screw section 26 relative to the outer screw section 24 is translated into an upwardly lifting thrust upon the automobile axle structure, which is continued until the wheels of the automobile are lifted clear of the road surface or ground.

It will be obvious that, as the above operations of the lift screw structure proceed, the check key means will automatically extend itself axially in correspondence to the axial movements of the lift screw sections. In so extending, the intermediate key member 35 slides downwardly relative to the anchored upper key member 32, and the anchored lower key member 26 slides downward relative to the intermediate key member 35, and since these key members are so formed as to be incapable of relative rotation, the retention of the inner screw section, and the jack shoe or foot plate carried thereby, against rotation is assured. The downward sliding movement of the intermediate key member 35 relative to the anchored upper key member 32 is limited by the engagement of the bill of the detent finger 38 with the stop shoulder 40, and, in like manner, the downward sliding movement of the lower key member 36 relative to the intermediate key member 35 is limited by the engagement of the bill of the detent finger 42 with the stop shoulder 44. The limitation of the extensibility of the check key means operates to restrain or limit the downward and outward movement of the inner screw section relative to the outer screw section, and consequently all risk of accidental separation of the former from its operative relation to the latter is eliminated.

It will be obvious that to return the jack mechanism to normal initial contracted condition, a reversal of the above described operations is carried out. In the retraction of the lift screw structure, the outer screw section 24 first moves axially upward without rotative movement, under the impulsion of the reversely rotated drive nut 14, until a lower stop element 62, provided at its lower end, engages said drive nut, whereupon reverse rotation of said outer screw section 24 is induced to cause the same to act as a drive nut upon the inner screw section 26, whereby the latter is in turn retracted to initial position within said inner screw section. Such contraction of the lift screw structure is accompanied by a like contraction of the extensible check key means, during the occurrence of which the upward movement of the lower key member 36 relative to the intermediate key member 35 will carry the release cam portion 45 into sliding engagement with the bill of the detent finger 42, thus swinging the latter outwardly to normal initial position; and in like manner, the upward movement of the intermediate key member 35 relative to the upper key member 32 will carry the release cam portion 41 into sliding engagement with the bill of the detent finger 38, thus likewise swing the latter outwardly to normal initial position.

Should it be desired to provide the novel jack mechanism according to this invention in a form calculated to furnish a lift screw structure of greater expansive or extendible stroke, said lift screw structure may comprise more than two lift screw sections, i. e. the lift screw structure may include three or more such sections. For example, in Fig. 8 a lift screw structure comprising three sections, viz. an outer screw section 63, an intermediate screw section 64 and an inner screw section 65. In such case, the outer screw section 63 is provided with internal threads 66 to engage the external threads of the intermediate screw section 64, and said intermediate screw section 64 is internally threaded to engage the threads of the inner screw section 65. The outer screw section 63 is provided with upper and lower stop elements 67 and 68 to engage the drive nut 14 for arresting axial movement and imparting ensuing rotative movement to said outer screw section with relative projecting or retracting effect, as the case may be, upon the intermediate screw section; and, in like manner, said intermediate screw section 64 is provided with upper and lower stop elements 69 and 70 to engage the internal screw threads 66 of said outer screw section 63 for arresting axial movement and imparting ensuing rotative movement to said intermediate screw section with relative projecting or retracting effect, as the case may be, upon the inner screw section 65. It will be understood that an extensible check key means, similar to that already described, will be employed to retain the inner screw section 65 against rotation.

It will be obvious that the lifting screw structure with its novel associated extensible check key means is adapted for incorporation in portable types of vehicle lifting jacks, as well as in the built-in jacks more specifically hereinabove described. Such lifting screw structure and associated check key means is not only very simple and efficient, but due to its compact construction and arrangement permits of easy and economical production of a jack mechanism of minimum bulk without sacrifice of structural strength and durability required in such mechanism.

It will be understood that many changes could be made in and many apparently widely different embodiments of this invention could be made without departing from the scope thereof as defined by the following claims. It is therefore intended that all matter contained in the above description or shown in the accompanying drawings shall be interpreted as illustrative and not in a limiting sense.

I claim:

1. In a vehicle lifting jack, a casing, an internally threaded drive nut mounted within said casing, gearing for rotating said drive nut, and a collapsible lift screw structure adapted to be actuated by said drive nut, said structure comprising a plurality of telescopically movable screw sections in interthreaded relation including a tubular innermost screw section having a jack-shoe attached to its exterior free end, and an extensible check key means extending axially through said screw sections with one end thereof affixed to the innermost screw section and its other end anchored to said casing, whereby said innermost screw section is retained against rotative movement, said check key means including a plurality of telescopically related key members incapable of relative rotation, and detent means cooperative with and between adjoining key members to limit relative extension thereof, said detent means comprising an indented stop shoulder together with an outwardly inclined release cam portion below said shoulder provided in a face of the upper end portion of a relatively interior key member, and a resilient detent finger having a stop bill inwardly projecting from its free end, said detent finger being affixed to a relatively exterior key member to project beyond its lower end so as to engage said stop shoulder to limit extension of said key members subject to disengagement from said shoulder by operation of said release cam portion upon telescopic contraction of said key members.

2. In a vehicle jack, a jack casing to support an extensible jack screw mechanism and operating means therefor, means for affixing said jack casing to the differential gear case of an automobile rear axle structure in a perpendicular position, said latter means comprising upper carrying brackets extending from the top end portion of said jack casing to abut the rear cover plate of said gear case so as to be affixed thereto by certain attachment bolts serving said rear cover plate, and lower carrying brackets extending from the bottom end portion of said jack casing transversely around said gear case to abut the front cover plate thereof so as to be affixed thereto by certain attachment bolts serving said front cover plate.

RAYMOND S. C. FOW.